(No Model.)
G. H. BREYMANN.
LAYING SUBMARINE PIPES.
No. 409,008. Patented Aug. 13, 1889.
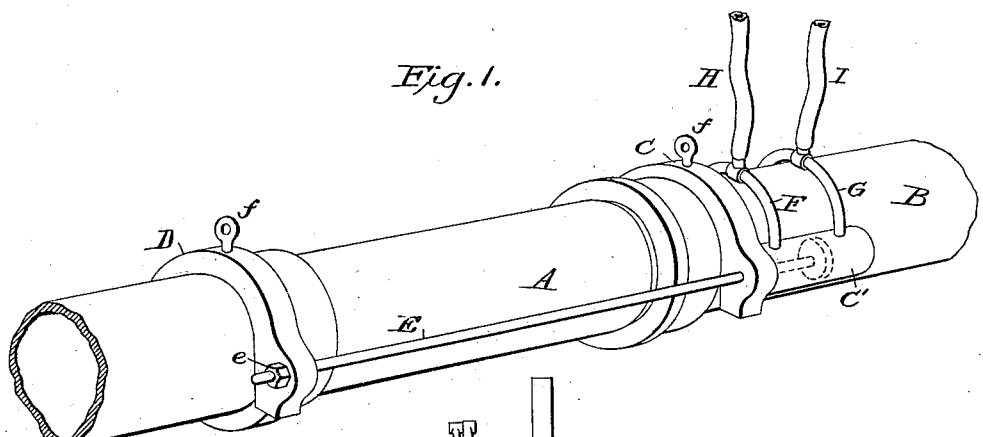
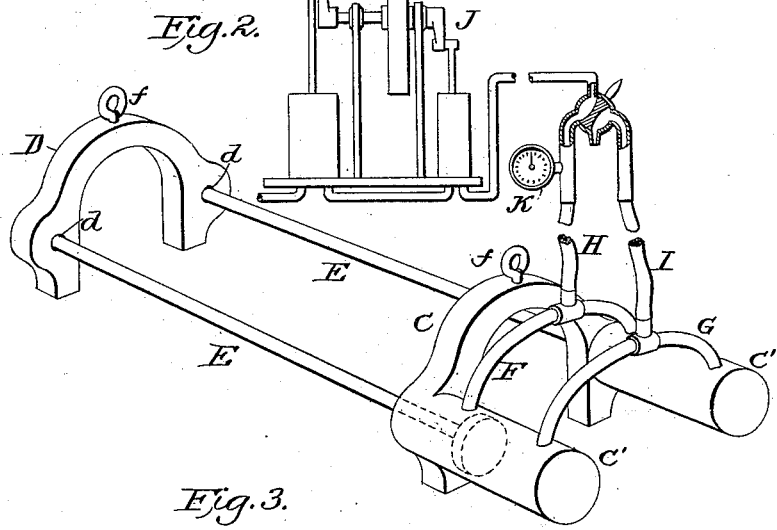
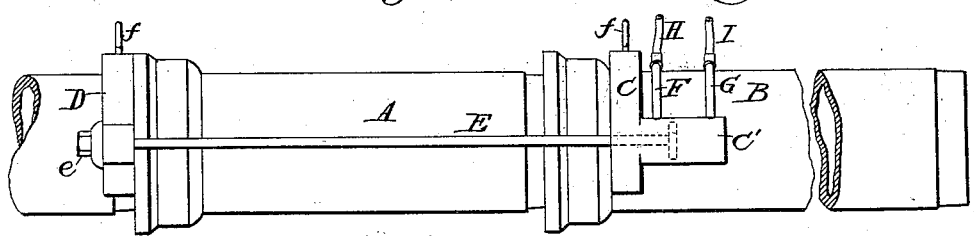
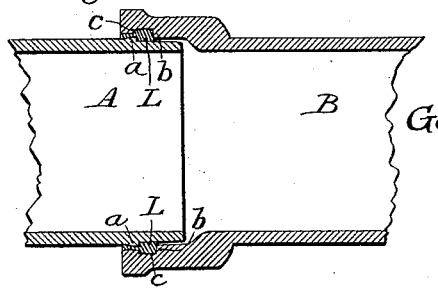
Witnesses:
James F. Duhamel
Horace A. Dodge
Inventor:
George H. Breymann,
by Dodge & Sons,
Attys.

ated August 13, 1889.
UNITED STATES PATENT OFFICE.

GEORGE H. BREYMANN, OF TOLEDO, OHIO.

LAYING SUBMARINE PIPES.

SPECIFICATION forming part of Letters Patent No. 409,008, dated August 13, 1889.

Application filed April 29, 1889. Serial No. 308,992. (No model.)

*To all whom it may concern:*

Be it known that I, GEORGE H. BREYMANN, a citizen of the United States, residing at Toledo, in the county of Lucas and State of Ohio, have invented certain new and useful Improvements in Laying Submarine Pipes, of which the following is a specification.

My invention relates to the laying of submarine pipes; and it consists in novel appliances therefor, which will be hereinafter explained, the same being in the nature of an improvement upon those for which Letters Patent were issued to Horace Thatcher and myself, dated December 27, 1887, No. 375,464.

In the accompanying drawings, Figure 1 is a perspective view of the apparatus as applied in practice, Fig. 2, a perspective view of the pneumatic jack and attendant parts for drawing the sections of pipe together and producing a tight joint; Fig. 3, a side elevation of what is shown in Fig. 1; Fig. 4, a longitudinal sectional view of the pipe, illustrating the formation of the joint.

In carrying out my invention two things are essential, namely, a pipe-joint or connection capable of being perfectly formed under water, and which shall permit longitudinal movement of the pipes by reason of expansion and contraction without injury to the joint, and means or apparatus for producing or completing such joint under water, and applying to the parts a predetermined pressure or force, so that while a perfect joint is assured all danger of breakage shall be avoided.

To this end the invention consists in producing a species of slip-joint between adjoining lengths of pipe, and in employing a pneumatic jack provided with a pressure-gage or pressure-regulator for forcing the nozzle or spigot end of one length into the bell of the other and compressing the packing used in the joint, the gage or regulator enabling the operator to apply precisely the amount of force necessary and safe to be used.

In working under water it is of course impracticable to make the common lead joint, such as is used for surface-pipes or pipes laid in trenches, and hence various joints to be formed without the use of molten metal have been proposed. Such joints, however, usually present one or both of two difficulties: they depend upon the wedging or compressing action of a tapered end of one pipe-length to expand or contract a packing-ring or gasket, or they make no provision for movement in the joint to compensate for longitudinal expansion and contraction of the pipe, which movement is considerable, and will inevitably open a joint made tight merely by the wedging or compressing force exerted by the tapered pipe end.

The exertion of a great and indeterminate pressure—such as is necessary to the formation of a joint by forcing the tapered end of a pipe-length into a packing-ring or gasket contained within the bell of an adjoining length—often results in the bursting of the bell or in the cracking thereof, so that, sooner or later, a leak occurs, which it is difficult to stop or even to locate under water. The importance of guarding against such an accident becomes manifest when it is remembered that such submarine pipes are commonly used to supply towns and cities with water, and that the occasion of their use is to insure a supply of water from a point so far distant as to avoid contamination by sewage from such town or city.

Referring again to the drawings, A and B indicate two pipe sections or lengths to be joined; and C, C', D, and E, the apparatus employed for bringing them together and perfecting the joint between them.

In order that the operation of this apparatus may be clearly understood, the character of the joint will be first explained, for which purpose reference is made to Fig. 4.

Here it will be seen that the spigot end of the length A is made cylindrical and formed with a circumferential shoulder $a$ at a suitable distance from the end, commonly about three and one-half inches, but variable as circumstances or conditions may require or suggest. It will also be seen that the bell end of section B is formed with an internal shoulder $b$, and that the inner circle or circumference of shoulder $b$ is of smaller diameter than the outer circle or circumference of shoulder $a$, so that their radial faces are opposed one to the other when one length has its end inserted into that of the next.

Within the bell end of the pipe is formed a shallow groove $c$, which forms a seat for and prevents the withdrawal of the lead gasket or packing-ring L, which is formed therein in the following manner, it being understood that this joint need not and ordinarily will not be used for each length, but only where two sections, each composed of a series of pipe-lengths, are to be joined:

Two pipe-lengths A and B being formed with the shoulders $a$ $b$ and groove $c$, as above explained, the cylindrical spigot end of the length A is inserted into the bell of length B to a point slightly beyond shoulder $b$. The annular space between them and inward from the groove $c$ is then calked, after which molten lead is run into the groove $c$ and caused to fill the same and the space between the bell and the spigot and is allowed to set therein. The spigot end is then withdrawn from the bell, leaving the lead ring or gasket therein held by the groove $c$. The pipes are then ready to be submerged preparatory to reuniting and permanently connecting them, the manner of sinking them being the same as set forth in the patent before mentioned. When the pipes are lowered to place, the spigot end of one section is brought into alignment with the bell of the next and started into the open end thereof. The pneumatic-jack apparatus C C' D E is then lowered to rest upon the pipes in the position shown in Fig. 1. This apparatus consists of two yokes C and D, of a size to freely straddle the pipe, the yoke C being formed or furnished with two hollow cylinders C', which are connected at each end by cross-pipes F and G, respectively furnished with supply pipes or hose H and I, both communicating with a pump J, and the former containing a pressure-gage K. Each cylinder contains a piston, (indicated by dotted lines in Figs. 1 and 2,) to which the rods E are directly connected, being, in effect, long piston-rods. These rods are somewhat longer than a length of pipe, pass freely through holes $d$ in the yoke D, and are threaded at their free ends to receive nuts $e$, as shown. By means of the nuts the distance between the yokes C and D may be nicely determined, the adjustment being made to suit the length of pipe used. The yokes C and D are each furnished with an eye $f$, to which is attached a rope or cable, by which the jack is lowered to place and raised again to the surface. Two sections or lengths of pipe having been duly lowered to place, and the end of one properly started into the other, the jack or pressure apparatus is lowered and the yokes C and D brought to the positions indicated in Fig. 1—that is to say, the yoke C is placed just back of the bell of pipe-length B, and yoke D is placed in front of and against the end of the bell of length A. The parts being thus made ready, compressed air is delivered to the cylinders C' C' through supply-pipe H in front of the pistons therein, until the pressure-gage indicates the predetermined degree of pressure, which, being attained, gives assurance that the joint is properly made.

It will readily be seen that, inasmuch as the lead gasket in the groove $c$ closely fits the inserted end of the adjoining length of pipe, a comparatively slight degree of pressure upon the gasket while closely confined within the groove and between the bell and spigot portions of the two pipe-lengths will effect an exceedingly close and tight joint. This pressure is brought to bear upon the gasket between the opposing shoulders $a$ $b$ of the pipe-lengths A B, the lead being made to flow or spread in a radial plane and to completely fill the annular space between the two parts.

It often happens that the pipe-lengths are not in absolute axial alignment, and hence it is important that the joint be such as will permit the lead to fill the space between the parts whether the faces or shoulders $a$ and $b$ be precisely parallel or not. The lead of course flows to such point or points as may afford the freest space for spreading, which, in case of imperfect alignment, will be the widest space between the shoulders $a$ $b$, and having completely filled the space it will be evenly compressed between faces $a$ and $b$ and caused to spread radially until a perfect joint is produced. After the joint is thus completed communication is cut off between the air pump or reservoir and the pipe H and an escape opened from pipe H to the atmosphere, a two-way valve answering both purposes, or equivalent provision being made.

Air under pressure is then admitted behind the pistons of cylinders C' C', through pipe I, to move the piston-rods E E outward and release the jack, which is then raised to the surface, the joint being completed in position.

It is manifest that hydrostatic pressure may be substituted for pneumatic without in any manner departing from the spirit of my invention.

I am aware that pipes have been forced together by hydrostatic pressure, and I do not lay claim to such idea, broadly; but so far as I am aware no apparatus has hitherto been devised by which such power might be employed to connect pipes, except the end of each length was exposed, so that the pressure might be applied directly to such end, a plan wholly impracticable for the purposes of this invention. It is not essential to employ pipe I, but it is desirable to do so.

Any air-compressing apparatus may be employed with or without a reservoir.

Although I prefer to use nuts on the rods E E, permanent heads, through-pins, or other stops may be used.

Having thus described my invention, what I claim is—

1. In combination with pipe A, having shoulder $a$, pipe B, having shoulder $b$, and groove $c$, gasket L, seated in said groove, yoke C, provided with cylinders C' C', yoke D, rods E, extending through openings in the yokes and provided with pistons within the cylinders, and a pipe H, connecting the cylinders with a pressure-chamber, all substantially as described.

2. The herein-described jack for use in joining submarine pipes, consisting of yokes C D, the former provided with cylinders C' C', rods E E, each provided at one end with a piston and at the other end with a nut or shoulder, and a pipe communicating with the cylinders and adapted to deliver thereto a fluid under pressure.

3. In combination with a jack substantially such as described and shown for connecting pipes under water, a supply-pipe for delivering a fluid thereto under pressure, and a pressure-gage serving to show the pressure applied to or by the jack, substantially as and for the purpose set forth.

4. In combination with yokes C D, the former provided with cylinders C' C', pistons arranged within said cylinders, rods E, extending from the pistons to yokes D, and pipes H I, communicating with opposite ends of the cylinders and with a pressure-chamber.

5. The herein-described joint for submarine pipe, consisting of a spigot end having shoulder $a$, bell end having shoulder $b$ and groove $c$, and gasket L, seated in said groove and adapted to be spread to fill the joint by compression between the shoulders $a$ and $b$.

In witness whereof I hereunto set my hand in the presence of two witnesses.

GEORGE H. BREYMANN.

Witnesses:
J. G. McKINNON,
CHAS. H. BREYMANN.